US006549217B1

(12) United States Patent
De Greef et al.

(10) Patent No.: US 6,549,217 B1
(45) Date of Patent: Apr. 15, 2003

(54) SYSTEM AND METHOD FOR COMPUTER SYSTEM MANAGEMENT USING BOOKMARKS

(75) Inventors: Bart De Greef, Waalre (NL); Mehran Moshfeghi, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/533,486

(22) Filed: Mar. 23, 2000

(51) Int. Cl.⁷ .................................................. G09G 5/00
(52) U.S. Cl. ........................ 345/745; 345/778; 345/779
(58) Field of Search .............................. 707/501, 501.1; 345/745, 778–779, 811

(56) References Cited

U.S. PATENT DOCUMENTS 5,692,143 A    11/1997   Johnson et al. .............. 395/339

FOREIGN PATENT DOCUMENTS

| EP | 0691605 | 1/1996 | ........... G06F/3/033 |
| EP | 06911604 | 1/1996 | ........... G06F/3/023 |
| EP | 0910088 | 4/1999 | ........... G11B/27/10 |

Primary Examiner—Kristine Kincaid
(74) Attorney, Agent, or Firm—John Vodopia (57) ABSTRACT

Methods, computer systems, software and computer readable media containing the software for bookmarking, or saving, multiple profiles associated with a user of a computer system, and for activating saved user profiles. At a top operating system level, a bookmarked user profile indicates the arrangement of the user's display devices available, including the type, position and size of open windows, as well as other of the user's preference parameters. At lower application levels, a bookmarked user profile indicates the arrangement of an application window, as well as other application preference parameters. A bookmark, or a bookmarked user profile, is activated by selection from a menu that can be displayed in the top level operating system desktop or within an application window. Commands are also provided for creating and managing bookmarks associated with a user.

21 Claims, 4 Drawing Sheets

SYSTEM AND METHOD FOR COMPUTER SYSTEM MANAGEMENT USING BOOKMARKS

BACKGROUND OF THE INVENTION

1. Field of the Invention

The present invention relates to systems and methods for management of interactive computer systems, and in particular to systems and methods for bookmarking user profiles and for selecting and activating the bookmarked user profiles, the bookmarked user profiles specifying at least the arrangements of an attached display device.

2. Description of the Related Art

Computer systems for some time have utilized graphical user interfaces (GUIs) to provide simple, intuitive and friendly access to system functions without requiring use of arcane and complex commands. GUIs typically present an arrangement of well-known graphical input elements, which can be selected and activated with a user pointing device in order to request system functions, and well-known output elements, which typically display information in adjustable windows.

Another common feature of computer systems are user profiles, which encapsulate user preferences for the many customizable system characteristics. Preferred characteristics encapsulated in user profiles include, notably, preferred GUI display characteristics and arrangements, along with other preferences such as lists of commonly-used system resources, files, World Wide Web (WWW) resources, and so forth.

In current computer systems, and especially in network connected computer systems, a single user profile often inadequately represents the complexity and diversity of user work. The number of system functions and resources relevant for a user often outstrips the abilities of present GUIs, in conjunction with available display devices, to manage a useable display of needed input and output display elements. Commonly-accessed resources for one user's various tasks are often too numerous or in conflict with each other.

Approaches to solving this problem include providing each user with the possibility of multiple independent profiles, where each profile specifies, for one set of tasks, both a display arrangement of input and output elements and also other preferences. However, in systems with multiple user profiles, changing between profiles is cumbersome. For example, to change from a current user profile to a new user profile, it is usually required that a user log entirely off the system and then log on again with the new user profile. This logoff-logon process is disruptive, time consuming, and grating to the user. For example, since applications may not save their current state, upon next logon it may be necessary to configure them again into the desired state from scratch.

One exemplary system requiring logoff-logon to change user profiles is Sun Microsystems Solar operating system Common Desktop Environment. Although, this environment saves the current session upon logoff so that a user can return to the saved session and also allows choice of a default session, the user still has to save data from each individual application, such as text editors and spreadsheets, prior to logoff. Another exemplary system is the Microsoft Windows NT operating system. Although in this system a user can have multiple profiles, logoff-logon is required to switch between them. Also, because they are completely independent, web browser history, bookmarks, cookies, temporary Internet files, and so forth, also contained in each user profile, cannot be shared among profiles.

Another approach to user profile is found in the virtual desktop feature of certain X11 window managers (e.g., fvwm, twm), which variably maps a physical display onto a virtual screen surface that is larger than the limits of the physical display. The user can switch between desktops by moving the display mapping to different portions of the virtual screen, each of which presents a desktop with customized colors, names, icons, root windows, and so forth. This mechanism, however, is inefficient because all the applications in all the desktops must be simultaneously loaded and executing.

Yet a further approach is described in European patent application EP 0 691 605 A1. Although the system described therein allows a user to switch between different desktop environments without a cumbersome logoff-logon process, the environments available to a user must be linked into a rigid hierarchical structure which strictly limits the ability to navigate freely between available environments in a consistent manner In summary, it is clear that all these known methods for management of user profiles, display arrangements, desktop arrangements, and so forth, are in one way or another cumbersome and limiting. What is needed, therefore, is a method and system for such management which allows simple, intuitive and friendly access to the plethora of system functions and resources available in modern computer systems.

Citation of a reference herein, or throughout this specification, is not to be construed as an admission that such reference is prior art to the Applicant's invention or the invention subsequently claimed.

SUMMARY OF THE INVENTION

The objects of the present invention are to provide systems and methods which overcome the above identified problems in the current art, namely provision of simple, intuitive and friendly access to the plethora of system functions and resources available in modern computer systems, and, in particular, provision of improved methods for management of user profiles, display arrangements, desktop arrangements, and so forth. These objects are achieved by provision of a bookmark metaphor for user profile management in computer systems as described herein.

Generally, the bookmark function to which the present invention is directed permits a user to select and activate a bookmarked user profile, including indication of display arrangements, from a menu of saved (or bookmarked) user profiles. Activation of a user profile causes the display to be arranged according to the indicated display arrangement. Display elements include any visual representation of running applications. Such visual representations include, for example, windows opened with determined positions, sizes and contents, minimized windows, or other iconic representations of running applications. Further, activation of a user profile optionally causes as well the establishment of other user preferences included in the activated user profile. Other user preferences include, in various combinations, environmental parameters defining a system or application environment, lists of commands to be executed to establish a desired environment, and background applications useful or necessary for the foreground applications, and so forth. Background applications can include server applications such as database or transaction servers. The bookmark function of the present invention also provides for the creation, editing, management, and display of bookmarked user profiles.

In one aspect of the present invention, a user profile pertains to the aspects of the operating system environment of the user's computer system which both manages the execution of one or more application programs for the user and also manages the arrangements of one or more display devices available to the user. In the following, for convenience only and without limitation, these aspect of the operating system environment are referred to as the "top" program level (or the "top level"), and the one or more operating system components responsible for the top program level are referred to as the "desktop" manager. In this aspect, therefore, the display arrangement described by a bookmarked user profile is the overall arrangement of application windows, iconic representations of running applications (such as minimized windows), system icons, and so forth presented on the user's display devices. The bookmarked user profile also optionally includes further user preferences relating to the operating system environment and available to all applications. Such preferences can include lists of commands to be executed, or background servers, such as database servers, that should be activated even if they have no representation on the user's display. For example, background servers indicated in an activated user profile that are not already running are started, while background servers that are already running but not indicated in an activated user profile are halted.

In particular, in this aspect, a menu of bookmarked user profiles is caused to be displayed in a manner consistent with the particular GUI of the operating system environment, for example, by selection of a "Bookmark" button displayed on an operating system taskbar. The menu of bookmarked user profiles can be displayed in various alternative manners. In one alternative, a list of textually-identified bookmarks is presented, optionally indexed by "thumbnails" or arranged in a hierarchical structure of folders containing bookmarks or other folders. Instead of text-oriented lists, the bookmarks can be represented by icons, for example, by automatically generated icons mimicking the bookmarked user display arrangement, or by user configured icons. The bookmark menu, however displayed, can be navigated by use of a pointing device or a keyboard, where certain keys or key combinations have been established as cursor control keys.

Upon selection and activation from the bookmark menu of textually-identified or ironically-represented bookmarks, a user profile is established by arranging the display device according to the indicated display configuration and by establishing any additional user preferences present in the user profile in a manner appropriate to the operating system environment. In detail, the display is arranged according to indications in the display configuration by closing any open applications not indicated to be open, opening applications indicated to be open but not yet opened, sizing and arranging open windows as indicated, and presenting and positioning as indicated other display elements, such as system icons and other iconic representation of running applications.

In another aspect, the user profile pertains to the environment local to a single local application, i.e., to a "lower" program level (or to a "lower level"). An advantageous local application environment, for example, a word processor, a spreadsheet, or an e-mail program, in the present invention controls an application window on the display device interior to which display elements relevant to the application are presented, perhaps either in sub-windows or in an iconic representations. Application display elements include, for example, documents, spreadsheets, messages, other iconic representations appropriate to individual applications, or so forth.

In particular, in this aspect, a menu of saved profiles is caused to be displayed in a manner consistent with the GUI of the particular application, for example, by selection of a "bookmark" button displayed on an.application toolbar. Selection of the bookmark button causes display of a bookmark menu with available bookmarks displayed in a, textual or iconic representation, as described above. Upon selection and activation, a bookmarked user profile is established by arranging the interior of the application window (at the "lower" program level) according to the indicated display configuration, for example, by opening, sizing and arranging indicated document, spreadsheet or message sub-windows, respectively. Also optionally, other user preferences indicated in the user profile information are set in the application.

In a further aspect, the bookmarking functions of this invention optionally operate in a hierarchical and recursive manner. In this aspect, an application can be opened by selection and activation of a bookmarked user profile at the top level that in turn indicates initial lower level profile that the application activates upon opening. Thereby, a single, bookmarked, top-level user profile can both indicate the overall arrangement of application windows on the user's display devices and also indicate the detailed internal arrangement of the individual application windows opened. Further, user profile bookmarking can be extended to any program level having selectable and configurable display elements or user preferences, from a top operating system environment level, to a lower application level, to still lower sub-application level, and so forth.

The present invention is also directed to computer system for the practice of the invention's bookmark methods. Appropriate computer system include, of course, laptop, desktop or server-type systems of known configuration, both networked or stand-alone. However, the invention is also applicable to other programmable systems with display devices of a size relatively limited in comparison to the elements needed to bell advantageously displayed. These other programmable system include portable communication devices such as personal digital assistants and wireless telephones. These other devices also include consumer electronics such as television with programmable elements or with a "set-top" box.

The present invention is also directed to software for directing computer system for the practice of the invention's methods and to computer-readable media encoded with this software. In a preferred embodiment, this software is structured as a bookmark manager with interfaces, on the one hand to the operating system desktop manager and to the user's applications, and with interfaces, on the other hand, to permanent storage where bookmarked user profiles can be stored.

In detail, the following embodiments and aspects implement these objects and aspect of the present invention. In a first embodiment, the present invention includes a method for user management of an interactive computer system having one or more attached display devices, the method comprising associating bookmark information with the user, wherein the bookmark information comprises one or more bookmarked user profiles, each user profile comprising indications describing an arrangement of display elements on the display devices, displaying in a pre-selected toolbar area on the display devices a selectable bookmark-display indicia, displaying on the display devices a bookmark menu upon user selection of the bookmark-display indicia, the bookmark menu comprising bookmark information associated with the user, wherein the bookmark menu provides for user selection of at least one bookmarked user profile, and arranging display elements on the display devices upon user selection of a user profile from the bookmark menu, wherein the display elements are arranged according to the indications in the selected user profile.

In a first aspect of the first embodiment, the invention also includes that the step of arranging further comprises: closing application windows not indicated to be open in the user profile, opening application windows (perhaps as minimized windows or as other iconic representations) indicated to be open in the user profile, positioning open application windows according to indications in the user profile, and sizing open application windows according to indications in the user profile. In a second aspect of the first embodiment, the invention also includes that the display elements further comprise elements displayed by a desktop manager of an operating system environment of the computer system, or further comprise application program sub-windows arranged within an application program window. In a third aspect of the first embodiment, the invention also includes that the bookmark menu includes one or more selectable commands for managing bookmark information associated with a user, and wherein the method further comprises a step of updating the bookmark information associated with a user upon user selection of one or more of the selectable commands. In a fourth aspect of the first embodiment, the invention also includes that a bookmarked user profile also comprises indications of further user preferences, and wherein the method further comprises a step of establishing the user preferences indicated in a selected user profile. These user preferences can include lists of commands to be executed or of background servers to be started or stopped.

In a second embodiment, the invention includes a computer system comprising: a processor with a CPU and CPU-accessible memory, devices for input from a user, and one or more display devices for output to a user, wherein the memory is configured with encoded program instructions for associating bookmark information with the user, wherein the bookmark information comprises one-or more bookmarked user profiles, each user profile comprising indications describing an arrangement of display elements on the display device, for displaying in a pre-selected toolbar area on the display devices a selectable bookmark-display indicia, for displaying on the display devices a bookmark menu upon user selection of the bookmark-display indicia, the bookmark menu comprising bookmark information associated with the user, wherein the bookmark menu provides for user selection of at least one bookmarked user profile, and for arranging display elements on the display devices upon user selection of a user profile from the bookmark menu, wherein the display elements are arranged according to the indications in the selected user profile.

In a third embodiment, the invention includes a computer readable media encoded with program instructions for causing a computer system to perform the methods of first embodiment.

BRIEF DESCRIPTION OF THE DRAWING

Other objects, features and advantages of the present invention will become apparent upon perusal of the following detailed description when taken in conjunction with the appended drawing, wherein.

DETAILED DESCRIPTION OF THE PREFERRED EMBODIMENTS

In the following, embodiments of the preferred aspects of the present invention are first described, followed by descriptions of exemplary implementations of the present invention. It will be immediately understood that the embodiments described in the following are exemplary and illustrative of the operation of the present invention in the context of one possible operating system environment and of its graphical user interface (GUI). The operation of the present invention in the context of other operating system environments and of their GUIs will be immediately apparent to one of skill in the art from perusal of the following.

Exemplary Embodiment of a First Aspect

Figure 1:
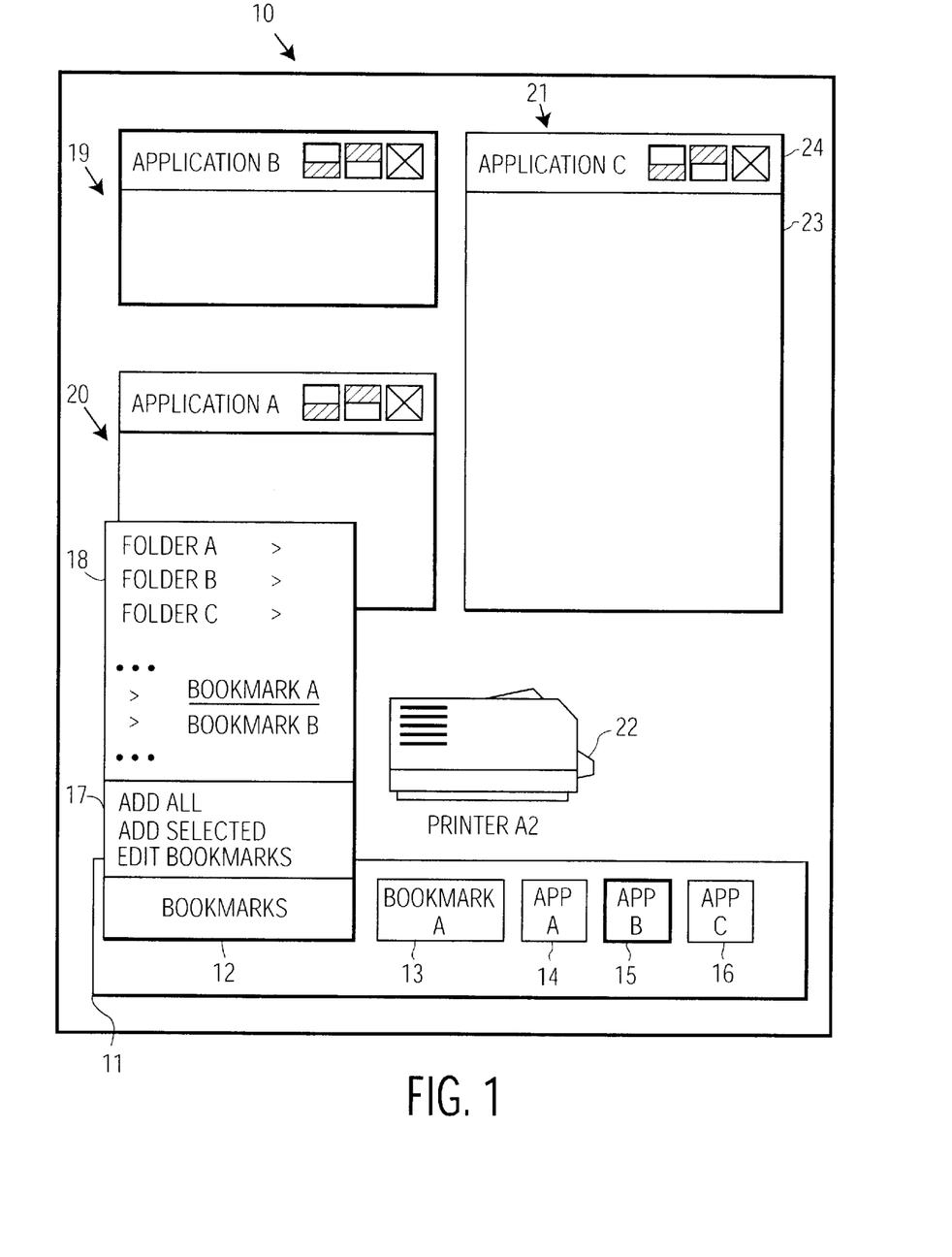
FIG. 1 illustrates an embodiment of the present invention applied to the top operating system display level.

FIG. 1 illustrates an exemplary embodiment of a first aspect of the present invention, in which the bookmarked user profiles pertain to the top operating system level. In this aspect, the profiled display configuration describes the top-level arrangement of the entire physical display area of one or more display devices attached to a computer system.

Illustrated here is the exemplary arrangement of the display device 10. This arrangement includes, first, operating system taskbar 11 with internal control areas 12–16. Control area 12, titled "BOOKMARKS" and preferably permanently present in the taskbar, upon selection importantly causes display of the bookmark menu. Control area 13, titled "Bookmark A" is preferably placed in the taskbar by the user and remains until explicitly removed. It allows for the direct activation of Bookmark A without the need for initial display of the bookmark menu and selection of Bookmark A from this menu. Control areas 14–16 are for control of open applications A, B and C, respectively, in standard manners. In alternative embodiments, it is apparent that other GUI mechanisms can be used to cause display of the bookmark menu.

Preferably, bookmarked user profiles (or simply "bookmarks") are objects or abstract data types recognized by the operating system environment, at least to the extent that they have associated iconic representation and point to methods called upon their selection and activation. The activation methods cause establishment of the bookmarked display arrangement and other user preferences. Accordingly, bookmarks can be copied from the bookmark menu and placed in any location where operating-system-recognized objects can reside, such as to control area 13 on taskbar 11, and in these locations are displayed with the associated iconic representation, and, when selected, activate the bookmarked profile.

In FIG. 1, control area 12 has already been activated to cause display of the bookmark menu, which is illustrated to have at least bookmark-editing segment 17 and bookmark-list segment 18. The bookmark-list segment, as illustrated, displays individual bookmarks, and folders of bookmarks (if present), the two types of entities being distinguished in this example by different placement of the indicia ">". They can also be distinguished by different graphical representations. Individual bookmarks can be selected and activated according to the standard methods of the operating system GUI. For example, here, "Bookmark A" is illustrated as already having been selected and activated. For convenience in organizing lists of bookmarks, the present invention includes placement of bookmark lists into conceptual folders, which are distinctively displayed on the bookmark menu. Selection of a folder, for example, "Folder A", causes display of its contained list of bookmarks, any of which can then be individually selected and activated.

Bookmark-editing segment 17 provides graphical access to commands for convenient management of bookmark. For purposes of illustration and without limitation, FIG. 1 illustrates commands "Add all", "Add selected" and "Edit bookmarks". Activation of the "Add all" command adds to a new or existing user profile the top-level properties of all open application windows, here applications windows A, B and C, including their sizes, locations, colors and other top-level properties, along with other display elements, such as displayed icons, and further user preferences in place. Preferably, this command presents the user with a dialog allowing the choice of an existing user profile or the name for a new user profile or folder. The "Add selected" command, upon activation, adds the top-level properties of selected application windows to a new or existing user profile. In FIG. 1 only application window B is selected as indicated by its emphasized border (and that of its taskbar control area). Finally, the "Edit bookmarks" command provides general functions to manage the bookmarks and folders for a given user, for example, to create, to delete, to update, to arrange or rearrange the folders, and so forth. Other or different editing commands can be added in known and standard manners.

FIG. 1 illustrates the results of activating "Bookmark A". For purposes of illustration, "Bookmark A" is taken as indicating, inter alia, that applications A, B and C are open with their windows positioned and sized as illustrated, and that icon "Printer A2" is present as illustrated. Accordingly, application windows 19, 20 and 21 for applications A, B and C, respectively, and icon 22 for printer A2 are present as illustrated. In the particular GUI of the illustrated operating system environment, an application window, for example application window 21, includes application control bar 24 and application data presentation area 23. Although many more controls would normally be present, application control bar 24 is illustrated here to contain only the application title and the three standard buttons for minimizing, maximizing and closing the application window. In area 23, application data (not illustrated) is presented to the user.

For a further example, if "Bookmark B" contains indications that only application windows D and E are to be opened with indicated sizes, locations, and other top-level properties, then selection of "Bookmark B" will cause the following actions. First, application windows A, B and C will be closed, with optional warnings to save any unsaved information. Second, windows for applications D and E, with their indicated sizes, positions, and other top-level properties will be opened. Third, other properties present in the user profile, such as workspace properties including foreground and background colors, fonts, relative window layering, and so forth, will also be established.

Therefore, switching between user profiles bookmarked as "Bookmark A" and "Bookmark B" merely involves selection from a menu. No logoff and logon are required.

In addition to explicit user selection and activation, bookmarked user profiles can be selected and activated by automatic system action. For example, a default profile can be specified which is activated upon starting the operating system environment. Further, user profiles can be attached to certain events in the operating system environment, occurrence of these events then automatically activating the attached user profile. If these events reflect changes in user tasks and work focus, the computer system can thereby be made to appear to adapt automatically to the user.

Exemplary Embodiment of a Second Aspect

Figure 2:
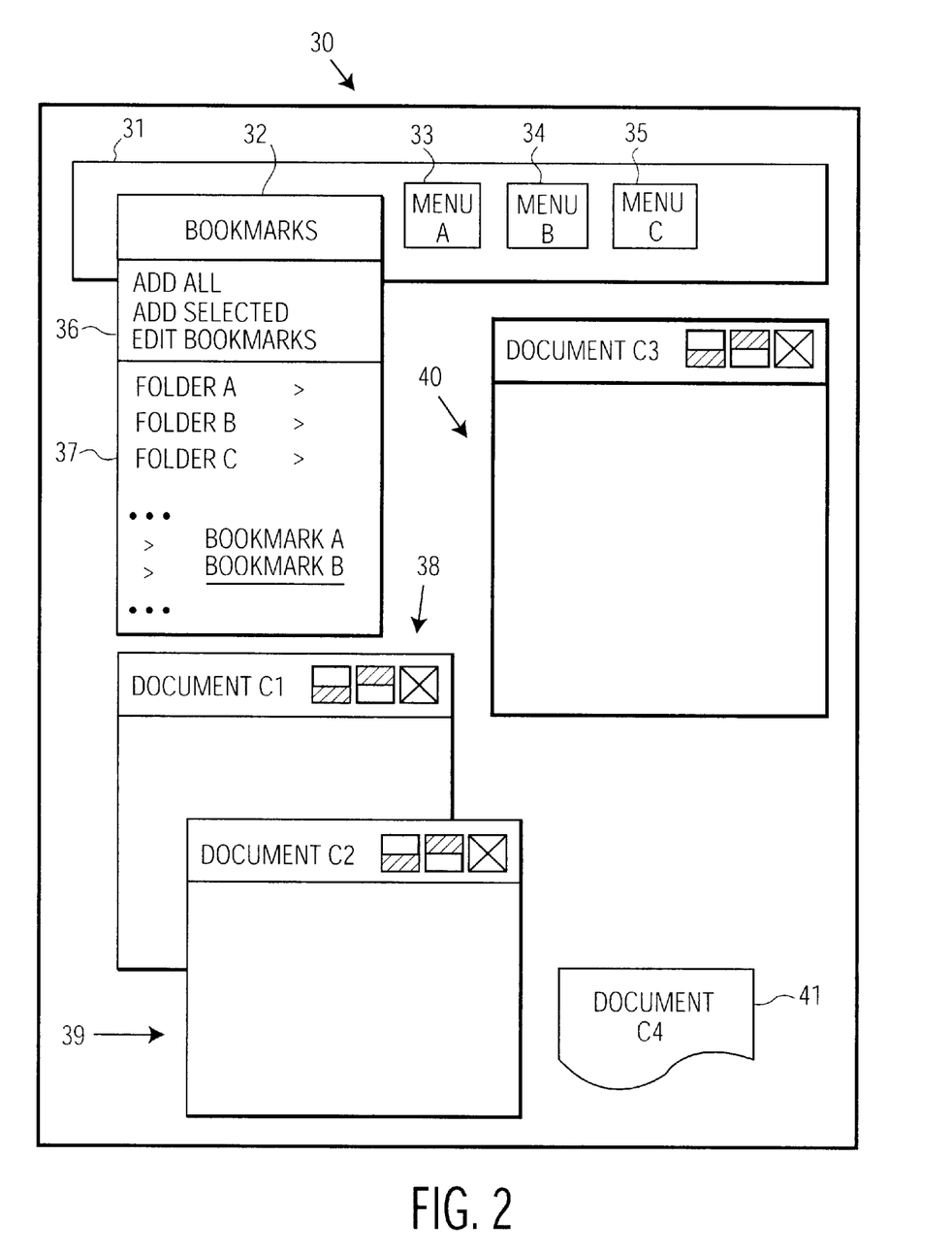
FIG. 2 illustrates an embodiment of the present invention applied to a lower application display level.

FIG. 2 illustrates an exemplary embodiment of a second aspect of the present invention, in which bookmarked profiles pertain to lower application levels, in particular to an exemplary word processor application, of the operating system environment. In this aspect, the profiled display configuration describes the detailed arrangement of a single application window present within a physical display area. For example, a bookmarked user profile in this aspect can describe, inter alia, the details of application window 21 for application C within display device 10 in FIG. 1.

This aspect of the present invention is particularly advantageous for those applications that allow one or more open sub-windows inside a main application window. These applications include typical productivity programs for common office tasks, such as e-mail, word processing, spreadsheet calculation, presentation preparation, calendar scheduling, project planning, and so forth, which often allow multiple messages, documents, spreadsheets, slides, and so forth, to be displayed in separate open application sub-widows. For example, within a main application window, Microsoft Word (word processing) can open and compare two or more documents; Microsoft Excel (spreadsheet) and Microsoft PowerPoint (presentation preparation) can similarly open multiple files. Most e-mail programs, for example Lotus Notes, allow a user to have multiple open folders and mail message windows. Without limitation, FIG. 2 illustrates a program for processing documents, for example, a word processor.

Bookmarking a profile describing the display arrangement of an application window, including the information displayed in sub-windows, permits easy recreation of that arrangement view with only a simple bookmark selection and activation command. In the absence of such bookmarking, recreating a display arrangement requires tedious entry, of multiple commands that separately open each sub-window with its particular information display, and then position and size each sub-window correctly.

Turning now to FIG. 2, the second aspect of the present invention is illustrated by an exemplary arrangement of application window 30. This arrangement includes, first, application toolbar 31 with internal menu icons 32–35. Menu icon 32, titled "BOOKMARKS" and illustrated as already having been selected, causes display of the bookmark menu, including bookmark-editing segment 36 and bookmark-list segment 37. Menu icons 33–35, upon selection, cause display of various application sub-menus, for example, file, edit, or help menus, in a standard manner according to the application GUI.

The bookmark menu in this second, application-level aspect functions similarly to the top-level first aspect. Accordingly, bookmark-list segment 37 displays individual bookmarks, and folders of bookmarks (if present), the two types of list elements being distinguished in this example by the different placement of the indicia ">". They can also be distinguished by different graphical representations. Selection of bookmarks, preferably according to methods standard for the application GUI, cause activation of the bookmark. Here, "Bookmark B" is illustrated as already having been selected and activated. Selection of a folder causes display of its contained list of bookmarks, any of which can then be individually selected and activated.

Bookmark-list segment 37 provides graphical access to commands, which preferably function similarly to those of the previous aspect, for convenient management of the bookmark list. Thus, activation of the "Add all" command adds to a new or existing user profile the application-level properties of open application sub-windows, including the source of any displayed information. The "Add selected" command, upon activation, adds the application-level properties of selected sub-windows to user profile. Here, sub-window C3 is illustrated as selected. Finally, the "Edit bookmarks" command provides general functions for managing the bookmarks and folders for a user.

FIG. 2 illustrates the results of activating "Bookmark B". For purposes of illustration, "Bookmark B" is taken as indicating, inter alia, that applications sub-windows C1, C2 and C3 are open with their windows positioned and sized as illustrated to display their respective documents (or other information in the case of other program types), while document C4 is represented as a minimized icon. Accordingly, application sub-windows 38, 39 and 40 and icon 41 are displayed as illustrated. In the particular GUI of the illustrated application environment, an application sub-window, for example application window 21, includes an application data presentation area and an application control bar including, at least, the document title and three standard buttons for minimizing, maximizing and closing the application sub-window.

For a further example, if "Bookmark A" contains indications that only application sub-windows C4 and C5 are to be opened with particular sizes, locations, and document contents, selection of "Bookmark A" will cause the following actions. First, the application will close sub-windows C1, C2 and C3, with optional warnings to save any unsaved information. Second, sub-windows C4 and C5 will be opened with their indicated sizes and positions and loaded with their document (or other appropriate information) contents. Third, other application properties present in the bookmarked user profile, such as screen colors, fonts, relative sub-window layering, and so forth, will also be established.

Therefore, Switching between application user profiles bookmarked as "Bookmark A" and "Bookmark B" merely involves a simple selection from a menu. Without the bookmarking mechanism, a user would have to enter multiple commands to close sub-windows C1, C2 and C3, multiple commands such as "File->Open->filename" to open new sub-windows C4 and C5, and possibly multiple further commands to adjust the window positions and sizes.

In addition to explicit user selection and activation, a bookmarked application user profile can be activated in other manners. For example, an initial bookmark provided and activated at application startup to arrange the initial application window and establish other user application preferences. If an initial bookmark is not explicitly specified, a default can be activated.

This facility can be particularly useful when combined with top level bookmarks that include an indication of initial application bookmarks to be activated at the startup of each indicated application window. Then an entire desktop environment with multiple application sub-environments can be entirely recreated merely by simple selection and activation of a single user profile. Thereby, a user can immediately achieve a desired work environment, avoiding entry of numerous, tedious operating system and application commands.

Further, this facility can include that the top-level bookmark editing commands, such as "Add all" or "Add selected", not only bookmark the top-level environment into a new or existing bookmark, but also cause all open applications to bookmark their own environments into new or existing initial bookmarks that are linked to the top level bookmark so that they are activated as initial bookmarks along with activation of the top level bookmark. Thereby, a user can bookmark an entire work environment with a single command.

Also it will be understood, that where a hierarchy of windows with sub-windows are present in a particular computer system environment, bookmarking user profiles according to the present invention can be applied to all levels in the hierarchy. The present invention is not limited to bookmarking just a top-level and a next application-level environment.

Exemplary Implementation

Methods of the present invention are preferably implemented by encoded program instructions (also herein called "software") which, when loaded into a computer system, configures the memory to cause the computer to perform these methods. The present invention is advantageously applicable to any computer system in which management of, at least, attached display devices can be aided by bookmarked user profiles. Although the following description is primarily with respect to laptop, desktop or workstation type computer systems of established structures, the present invention is not so limited. For example, it can be implemented on hand-held devices, such as personal digital assistants, for example, the Palm Pilot series of 3Com Corp., advanced wireless telephones, especially having Internet access and so forth. The present invention can also be implemented on such consumer electronics items, such as television sets with programmable components, especially set-top boxes, and so forth.

Figure 3A:
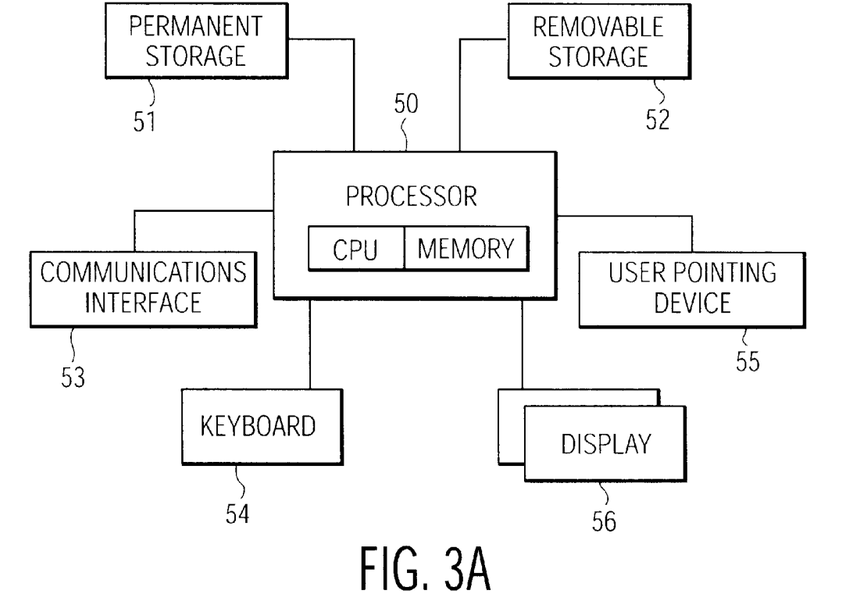
FIG. 3 illustrates computer systems for the practice of the present invention.
Figure 3B:
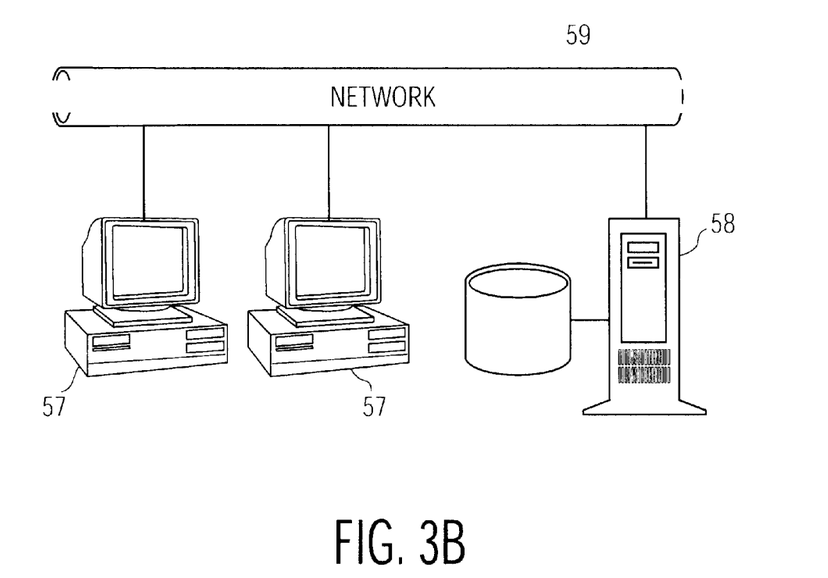

Therefore, FIGS. 3A and 3B illustrate exemplary, but not limiting, computer systems for practicing the present invention. In particular, FIG. 3A illustrates an exemplary computer system, which includes processor 50, with at least a CPU and CPU- accessible memory, permanent storage means 51, for example, fixed magnetic disks, removable storage means 52, for example, an optical disk reader, and communications interface means 53, for example, an Ethernet or an Internet connection. Also included are user input means including keyboard 54 and user pointing device 55, for example, a computer mouse, and user output means, such one or more display devices 56.

FIG. 3B illustrates a further exemplary networked computer system. This system includes user computer systems 57, for example, such as the one illustrated in FIG. 3A, server computer system 58, and connecting network 59. In this system, information centrally stored on permanent storage means attached to the server system can, be made available to the user systems. For example, the centrally-stored information can include user bookmark information or application specific information, for example, documents, spreadsheets, messages, or so forth.

In further embodiments, bookmark information associated with a user can be made available across a network in other known alternatives. In one such alternative, the bookmark information may be present as a resource with a determined universal resource locator (URL) which is accessible by the hypertext transfer protocol (HTTP). In particular, a user's bookmarks, or one set of a user's bookmarks, could be available on the world wide web at an address such as http://myserver/mybookmarks/dev.bookmark. This address can be input to direct the methods of the present invention to the correct set of bookmarks. In another such alternative, a user's bookmark information, or one set thereof, may be present in a network accessible file, at an address such as \\myserver\me\mybookmarks\dev.bookmark. This file address can be input to the methods of the present invention in order to point to the desired set of bookmarks.

The software (or encoded program instructions) which configure the processor memory for causing the processor to perform the bookmarking methods of the present invention can be loaded into a computer system by standard means, for example, by being read by the removable storage means from a computer readable medium, for example, an optical disk, or by being downloaded by the communication interface means from, for example, an Internet site. Once loaded into CPU-accessible memory, the software permits a user to select, activate, or edit bookmarks by using the system user input and output means.

Figure 4:
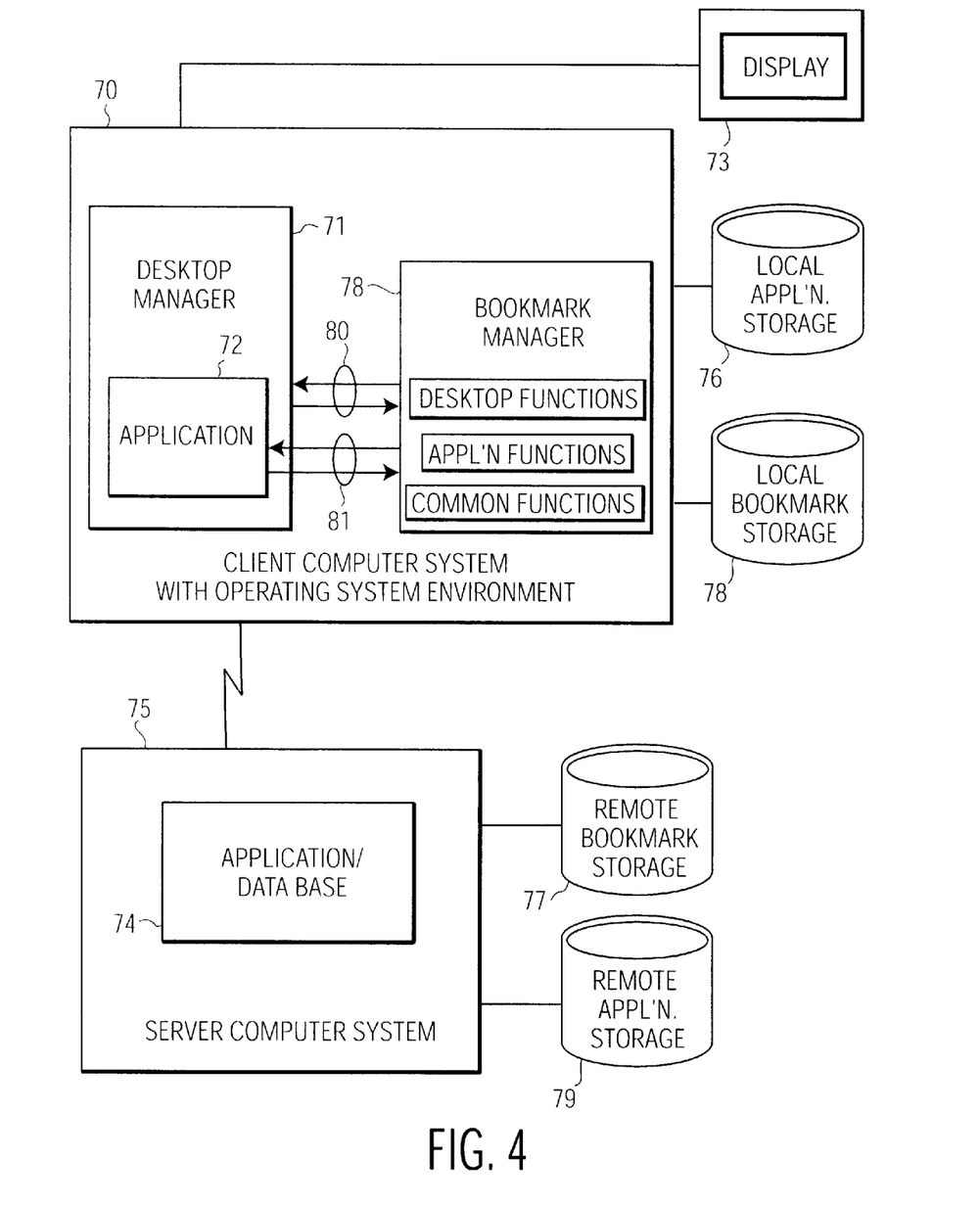
FIG. 4 illustrates a software structure for practice of the present invention.

Within a computer system, software for the present invention can assume a variety of structures. FIG. 4 illustrates a preferred, but not limiting, structure appropriate for the computer systems illustrated in FIGS. 3A and 3B. Here, client computer system 70 is, for example, similar either to the computer system illustrated in FIG. 3A or to the computer systems 57 of FIG. 3B. Server computer system 75 is, for example, similar to server computer system 58 of FIG. 3B and is networked with client system 70.

System 70, together with its operating system environment, is illustrated in an exemplary embodiment as including desktop manager component 71, which includes one or more software sub-components for managing user access to system 70, the user workspace and the arrangement of display device 73, and the one or more applications 72 employed by a user. For example, the desktop manager can include a "shell" program which validates a user's identity at logon and establishes user access permissions to system 70. Each user can be identified in standard manners, for example, by a user id (also referred to herein as the "userid"). On request from a validated user, the desktop shell program can start applications, monitor their execution, and terminate them. User applications can either be entirely resident locally in client computer system 70, or can include a server or data base component 74 resident in server system 75 which interacts with a client-resident component. Accordingly, user application data can reside either on the client system, or on the server system, or on both, as illustrated by storage areas 76 and 77.

In the exemplary software structure of FIG. 4, the methods of the present invention are principally performed in bookmark manager 78, illustrated therein as a separate component available in the operating system environment for accepting requests and returning responses. Internally, the bookmark manager is illustrated as having at least common functions, desktop-specific functions, application-specific functions. The application-specific function component is for support of requests from applications (or lower level bookmark requests), while the desktop-specific function component is for support of requests from the desktop manager, or similar component(s), or the operating system environment(or higher level bookmark requests). The common function component supports bookmark services or functions common to all levels of. bookmarking, such as bookmark file management. Bookmarked user profiles are stored in a preferably standard format described subsequently, and can be associated with each individual user by the user identification employed by the operating system, for example, by the userid.

Bookmarked user profiles referenced by the bookmark manager can reside either on the client system, or on the server system, or on both, as illustrated by storage areas 78 and 79. Their address can be known to the bookmark manager by default. Alternately, the address of the desired set of bookmarks can be input to the bookmark manager as a universal resource locator, or as the network address of a file, or so forth.

This preferred but exemplary software structure functions as follows. In one aspect in which bookmarked user profiles pertain to the top operating system environment level, managed according to FIG. 4 by desktop manager 71, the user selects a user profile from the bookmarked user profiles (or bookmarks) associated with that user through, for example, the user id, and indicates it for activation by standard methods according to the desktop manager GUI. As indicated by interface 80. Internally, this component formulates a request to, for example, the common function component, for retrieval of a standardized description of the activated user profile. The common function component retrieves the requested description from either local bookmark storage 78 or remote bookmark storage 79, and returns the description to the desktop manager component. The desktop manager component then parses the formatted profile description,land returns across interface 80 the specific instructions, commands and parameters that cause the desktop manger to arrange the display devices as indicated and to establish other components of the user profile.

In the other aspect in which bookmarked user profiles pertain to lower application levels, managed according to FIG. 4 directly by application 72, the interface with the application is established by the application function component of the bookmark manger, which is specialized to interact with the application across interface 81. In particular, this component receives a selected user profile, and then returns the application-specific instructions, commands and parameters to the application to establish the activated user profile.

For the bookmark editing commands, the desktop function or the application function component, as appropriate, can receive the editing request and pass the requested editing actions to the common function component. The common function component then can perform the requested creation, update, or other actions in the local or remote bookmark storage.

Further, preliminary to the actions described above, for example, upon selection of a "Bookmark" icon, the bookmark menu associated with an identified user can be passed to the desktop manager, or as appropriate to the application, by their respective bookmark manager components. Information for the respective bookmark menus, including lists of bookmarked user profiles associated with the user, is retrieved from bookmark storage by, for example, the common function component.

The present invention is not limited to this preferred implementation. For example, in view of the above description, one of skill in the art will understand that other functional sequences and distributions are possible. In one alternative functional distribution, the desktop-function component and the application-function component can be removed from the bookmark manager and integrated into the desktop manager and the application, respectively. In this alternative, the bookmark manager can consist principally of common functions having fewer but more standardized interfaces with other entities in the operating system, instead of the illustrated alternative in which the bookmark manager has more interfaces which are more specialized for each entity. Further, the bookmark manager itself may be implemented as a sub-component of the desktop manager, or of each application, or of both, or otherwise integrated into the operating system environment. In one alterative functional sequence, the common function component can, upon user logon, immediately retrieve all the bookmarked user profiles associated with that user for later use if necessary. The present invention is intended to cover, such alternative implementations.

Format of Bookmarked User Profiles

The storage format for bookmarked user profiles is such that the bookmark manager, however structured and implemented, can parse them in order to obtain the necessary information to perform the processing necessary establish the indicated screen display and other profile elements. Although the desktop manager and each application can use a separate storage format, a common storage format is preferable, which includes, at least, indications of open display windows, the positions and sizes of the windows, the contents of the windows, and other user preference parameters.

In the following, preferable storage formats are illustrated for "Bookmark B", which profiles the situation illustrated in FIG. 2 where application is taken to be the Microsoft Word program. Therefore, the illustrated storage formats include sufficient information so that the three windows with their corresponding sizes and positions can be opened with the correct content at the correct scroll position, etc. In the illustrations, actual variable values are indicated symbolically indicated.

A first alternative storage format uses a self-describing properties-file format, which includes a list of all necessary properties and their values. An exemplary properties-file for "Bookmark B" follows.

```
[
bookmark.name: BookmarkB
bookmark.adddate: 06091999
window_1.x: X1
window_1.y: Y1
window_1.width: W1
window_1.height: H1
window_1.iconified: false
window_1.application:      C:\Program Files\Microsoft Office\Office»INWORD.EXE
window_1.file: D:\My Documents\Document C1.doc
window_1.zoom: ZI
window_1.xscrollbar: SX1
window_1.yscrollbar: SY1
window_1.selected: false
window_2.x: X2
window_2.y: Y2
window_2.width: W2
window_2.height: H2
window_2.iconified: false
window_2.application:      C:\Program Files\Microsoft Office\Office\WINWORD.EXE
window_2.file: D:\My Documents\Document C2.doc
window_2.zoom: Z2
window_2.xscrollbar: SX1
window_2.yscrollbar: SY2
window_2.selected: false
window_3.x: X3
window_3.y: Y3
window_3.width: W3
window_3.height: H3
window_3.iconified: false
window_3.application:      C:\Program Files\Microsoft Office\Office\WINWORD.EXE
window_3.file: D:\My Documents\Document C3.doc
window_3.zoom: Z3
window_3.xscrollbar: SX3
window_3.yscrollbar: SY3
window_3.selected: true
window_4.x: X4
window_4.y: Y4
window_4.width: W4
window_4.height: H4
window_4.iconified: true
window_4.application:      C:\Program Files\Microsoft Office\Office\WINWORD.EXE
window_4.file: D:\My Documents\Document C4.doc
window_4.zoom: Z4
window_4.xscrollbar: SX4
window_4.yscrollbar: SY4
window_4.selected: false
(...other profile parameters...)
]
```

This bookmarked user profile list properties for each window including, for example, its position and size, its visibility status (e.g., iconified or not), its application, the document being displayed, its zoom parameter, its horizontal and vertical scroll bar positions, and its selected status. As illustrated the properties are represented in a textual representation; alternatively the properties could be encoded; further, the values for each window can be placed in a fixed format record.

Another alternative storage format uses a self-describing eXtensible Markup Language (XML) format. XML is a restricted form of the Standard Generalized Markup Language (SGML) that is designed for use over the WWW. See, e.g., Extensible Markup Language (XML) 1.0, W3C Recommendation Feb. 10, 1998, http://w3c.org/TR/REC-xml. XML separates structure from presentation and has many potential applications, such as, to intelligent searching, to messaging, and to data conversion. An exemplary XML file for "Bookmark B" follows.

```
<xml version="1.0">
<bookmarklist>
<bookmark    name="BookmarkB"
             adddate="06091999">
   <window   x="X1"
             y="Y1"
             width="W1"
             height="H1"
             iconify="false"
             application="C:\Program Files\Microsoft
             Office\Office\WINWORD.EXE"
             file="D:\My Documents\Document C1.doc"
             zoom="Z1"
             xscrollbar="SX1"
             yscrollbar="SY1"
             selected="false"/>
   <window   x="X2"
             y="Y2"
             width="W2"
             height="H2"
             iconify="false"
             application="C:\Program Files\Microsoft
             Office\Office\WINWORD.EXE"
             file="D:\My Documents\Document C2.doc"
             zoom="Z2"
             xscrollbar="SX2"
             yscrollbar="SY2"
             selected="false"/>
   <window   x="X3"
             y="Y3"
             width="W3"
             height="H3"
             iconify="false"
             application="C:\Program Files\Microsoft
             Office\Office\WINWORD.EXE"
             file="D:\My Documents\Document C3.doc"
             zoom="Z3"
             xscrollbar="SX3"
             yscrollbar="SY3"
             selected="true"/>
   <window   x="X4"
             y="Y4"
             width="W4"
             height="H4"
             iconify="true"
             application="C:\Program Files\Microsoft
             Office\Office\WINWORD.EXE"
             file="D:\My Documents\Document C4.doc"
             zoom="Z4"
             xscrollbar="SX4"
             yscrollbar="SY4"
             selected="false"/>
(...other profile parameters...)
</bookmark>
</bookmarklist>
```

In this example, window parameters are shown as attributes of a window element. An alternative representation is to use element names for each of the parameters. XML Document Type Definitions (DTDs) can also be used to encode default values for some of the attributes and provides shorter representations.

Both these alternative storage formats also illustrate optional use of versioning. When a bookmarked user profile is shared, a timestamp can be included in the storage format, for example the "adddate" parameter above. When an application file is later opened as indicated by the bookmark, the current timestamp of the file can be compared with the timestamp of the saved bookmark. If they differ, the user can be alerted to the fact that the bookmark may include inconsistent references to the application file.

With more sophisticated applications, certain reference information, for example file position, could be indicated by context information, for example by line number, by surrounding text, or so forth, to enable later correct repositioning. For instance, the emacs editor has a mechanism (etags) to create a tag file for an arbitrary collection of files (typically computer program source code) which enables the user to directly go to a tagged position, even if parts of the file have been modified.

The present invention is adaptable to other storage formats and methods for bookmarked user profiles of equal information containing abilities. For example, bookmarked user profiles can be stored in a centralized directory, for example, in a directory according to the lightweight directory access protocol (LDAP), where directory schema elements represent bookmarked user profiles. Bookmarked user profiles (bookmarks) can then be accessed by a simple reference anywhere that the directory server can be accessed, for example, by a universal resource indicator of the form ldap://<server>/<bookmark>. A nomadic user could use the same bookmarks, at home, at the office or when traveling. Alternatively, when the operating system environment is one of the Microsoft Windows family of operating systems, bookmarks could be stored locally in the operating system registry or centrally in an active directory.

Extensions and Alternatives

The present invention includes the following optional extensions and alternative embodiments. In a first significant alternative embodiment, bookmarked user profiles can be e-mailed to a recipient in a message, who can then activate the received bookmark. For example, the user can copy, for example by dragging, a bookmark from an application's bookmark window list into a composed e-mail message and can send the message to the recipient. When the recipient selects the bookmark contained in the received message, the e-mail application interacts with the bookmark manager in order to activate the bookmark. If the user had e-mailed "Bookmark B" illustrated in FIG. 2 and if the recipient had activated the received bookmark, the application window illustrated in FIG. 2 would be opened and arranged on the recipient's display device as illustrated therein. Alternatively, to avoid problems with file access and file authority, the e-mail program could include copies of all files directly or indirectly referenced in the bookmark. Thereby, a recipient can activate the complete bookmarked window even if the original files are not directly accessible. Also, when attaching a bookmark to an e-mail message, the user may be asked to save any files referenced in order to ensure files consistency. Time stamps c an also be included. For example, the XML Bookmark Exchange Language, or XBEL, is an interchange format for bookmark data used by current Internet browsers. See, e.g., The XML Bookmark Exchange Language (XBEL), http://www.python.org/topics/xml/xbel.

In this alternative, bookmarks are preferably recognizable within the operating system environment as a system object or an abstract data type. Therefore, the e-mail program is easily able to recognize an embedded bookmark, to receive the activation for the bookmark, and to pass the request across the correct interface to the bookmark manager for activation processing.

In a second alternative embodiment, bookmarks and folders represented in bookmark menus, for example the bookmark menus illustrated in FIGS. 1 and 2, can be represented by icons. Preferably, one icon type is used for bookmarks, and another icon type is used for folders. Optionally, the icon types can be separately personalized so that particular bookmarks or folders can be easily distinguished.

In another alternative, instead of being able only to select bookmarks or folders for activation or display, by alternative selection actions, such as by clicking the right mouse button, the detailed contents of the bookmarks or folders can be schematically displayed, for example, the windows indicated to be opened can be listed. Thereby, a user can easily recall the meaning of items displayed in the bookmark menu. Further, the user can be provided the ability to individually select portions of the displayed bookmark content for activation, instead of being required to accept activation of the entire contents.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for user management of an interactive computer system having one or more attached display devices, the method comprising:

associating bookmark information with the user, wherein the bookmark information comprises one or more bookmarked user profiles, each user profile comprising indications describing an arrangement of display elements on the display devices, displaying in a pre-selected toolbar area on the display devices a selectable bookmark-display indicia, displaying on the display devices a bookmark menu up, on user selection of the bookmark-display indicia, the bookmark menu comprising at least one selectable user profile and providing for the display of all user profiles associated with the user, and arranging display elements on the display devices upon user selection of a user profile from the bookmark menu, wherein the display elements are arranged according to the indications in the selected user profile.

2. The method of claim 1 wherein the display elements comprise application program windows arranged on the display device.

3. The method of claim 2 wherein the step of arranging further comprises closing application windows not indicated to be open in the user profile, opening application windows indicated to be open in the user profile, positioning open application windows according to indications in the user profile, and sizing open application windows according to indications in the user profile.

4. The method of claim 3 wherein the display elements further comprise elements displayed by a desktop manager of an operating system environment of the computer system.

5. The method of claim 1 wherein the display elements comprise application program sub-windows arranged within an application program window.

6. The method of claim 5 wherein the step of arranging further comprises closing application sub-windows not indicated to be open in the user profile, opening application sub-windows indicated to be open in the user profile, loading information contents into the application sub-windows as indicated in the user profile, positioning open application sub-windows according to indications in the user profile, and sizing open application sub-windows according to indications in the user profile.

7. The method of claim 5 wherein the application window comprises a plurality of recursively arranged sub-windows, and wherein the display elements comprise application display elements arranged in any of the recursively arranged sub-windows.

8. The method of claim 1 wherein the bookmark menu includes one or more selectable commands for managing bookmark information associated with a user, and wherein the method further comprises a step of updating the bookmark information associated with a user upon user selection of one or more of the selectable commands.

9. The method of claim 8 wherein the updating comprises creating or editing or deleting or arranging the bookmark information associated with a user.

10. The method of claim 1 wherein the display elements comprise application program windows arranged on the display device and application program sub-windows arranged within at least one application program window, and wherein the method further comprises arranging the application program windows on the display device according to indications in the selected user profiles and arranging the application sub-windows within the application windows also according to the indications in the selected user profile.

11. The method of claim 1 further comprising selection of a pre-determined bookmarked user profile in the bookmark information associated with a user upon occurrence of a pre-determined event in an operating system environment of the computer system, and arranging display elements on the display device according to the indications in the selected user profile.

12. The method of claim 1 wherein a bookmarked user profile also comprises indications of further user preferences, and wherein the method further comprises a step of establishing the user preferences indicated in a selected user profile.

13. A computer system comprising:

a processor with a CPU and CPU-accessible memory, devices for input from a user, and one or more display devices for output to a user, wherein the memory is configured with encoded program, instructions for
associating bookmark information with the user, wherein the bookmark information comprises one or more bookmarked user profiles, each user profile comprising indications describing an arrangement of display elements on the display device,
displaying in a pre-selected toolbar area on the display devices a selectable bookmark-display indicia, displaying on the display devices a bookmark menu upon user selection of the bookmark-display indicia, the bookmark minu comprising at least one selectable user profile and providing for the display of all user profiles associated with the user, and
arranging display elements on the display devices upon user selection of a user profile from the bookmark menu, wherein the display elements are arranged according to the indications in the selected user profile.

14. The system of claim 13 wherein the computer system is a laptop-type, or a desktop-type, or a server-type computer system.

15. The system of claim 13 wherein the computer system is a personal digital assistant type system, a wireless telephone type system, or a system including television display capabilities.

16. The system of claim 13 wherein the memory is further configured with the encoded program instructions to provide a bookmark manager for receiving requests for bookmark information associated with a user and returning responses including requested bookmark information.

17. The system of claim 16 wherein the bookmark manager is further for receiving requests to activate a bookmarked user profile and for returning responses including instructions causing the arranging of the display elements on the display device as indicated in the user profile to be activated.

18. The system of claim 17 wherein the bookmark manager provides separate interfaces for requests and responses to a desktop manager present in the computer system and for requests and responses to one or more applications present in the system.

19. A computer readable media encoded with program instructions for causing a computer system to perform the method of claim 1.

20. The method of claim 1, further comprising the steps of:
displaying in the pre-selected toolbar area on the display devices at least one selectable bookmark user profile, and
arranging display elements on the display devices upon user selection of the user profile in the pre-selected toolbar area, wherein the display elements are arranged according to the indications in the selected user profile.

21. The system of claim 13, wherein the memory is further configured with the encoded program instructions to display in the pre-selected toolbar area on the display devices at least one selectable bookmark user profile and to arrange display elements on the display devices upon user selection of the user profile in the pre-selected toolbar area, wherein the display elements are arranged according to the indications in the selected user.

* * * * *